BEST AVAILABLE COPY

United States Statutory Invention Registration [19]

[11] Reg. Number: H132

Ohtani et al. [45] Published: Sep. 2, 1986

[54] TWIN-PLATE CLUTCH

[76] Inventors: Hisao Ohtani, 4-48, Heiwa-cho, Toyota-shi, Aichi-ken; Satoru Maruyamano, 2-56, Ekakushinmachi, Toyota-shi, Aichi-ken, both of Japan

[21] Appl. No.: 684,578

[22] Filed: Dec. 21, 1984

[30] Foreign Application Priority Data

Dec. 28, 1983 [JP] Japan ..... 58-201932[U]

[51] Int. Cl.[4] ..... F16D 21/00

[52] U.S. Cl. ..... 192/48.1

[58] Field of Search ..... 192/48.1, 48.8, 70.2, 192/70.18, 107 C, 109 A; 188/71.5

[56] References Cited

U.S. PATENT DOCUMENTS 3,317,013 5/1967 Smirl ..... 192/70.18

FOREIGN PATENT DOCUMENTS 711586 6/1965 Canada ..... 192/48.8
1161149 1/1964 Fed. Rep. of Germany ..... 192/48.8
2146402 9/1971 Fed. Rep. of Germany ..... 192/48.8

*Primary Examiner*—Harold J. Tudor

[57] ABSTRACT

A twin-plate clutch comprises an annular intermediate plate interposed between a fly wheel and a pressure plate, a first clutch disc interposed between the intermediate plate and the fly wheel, and a second clutch disc interposed between the intermediate plate and the pressure plate, wherein the first clutch disc is provided with facings fixed to an outer circumferential portion of a disc plate thereof under a condition of no cushioning function in an axial direction of the first clutch disc, and the second clutch disc is provided with cushion springs fixed to an outer circumferential portion of a disc plate thereof and facings fixed on both sides of the cushion springs. With this arrangement, an amount of axial movement of the second clutch disc of the twin-plate clutch is rendered small, thereby suppressing increase in a pedal stroke and reducing wear between a clutch hub of the second clutch disc and an input shaft. Further, it is possible to easily carry out semi-engagement operation of the clutch owing to the provision of cushioning function in an axial direction of the second clutch disc.

1 Claim, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TWIN-PLATE CLUTCH

BACKGROUND OF THE INVENTION

This invention relates to a twin-plate clutch including an annular intermediate plate interposed between a fly wheel and a pressure plate, a clutch disc interposed between the intermediate plate and the fly wheel, and another clutch disc interposed between the intermediate plate and the pressure plate.

In this type of twin-plate clutch, an amount of axial movement of the intermediate plate accompanied by engagement and disengagement of a clutch is set to a value greater than an amount of cushioning in an axial direction of a clutch disc on the fly wheel side (which will be hereinafter referred to as a first clutch disc), and it is necessary that a clutch disc on the pressure plate side (which will be hereinafter referred to as a second clutch disc) should be axially moved to a greater extent than the intermediate plate. Accordingly, when the amount of cushioning in the axial direction of the first clutch disc is large, the amount of axial movement of the second clutch disc is rendered large in dependence upon the above, thereby causing increase in a pedal stroke as required by a clutch operation and early deterioration of a spline between an input shaft and a clutch hub. However, in the case that a cushioning function in the axial direction of both the clutch discs as above is removed, there will occur a problem of difficulty in semi-engagement operation of a clutch.

SUMMARY OF THE INVENTION

It is an object of the present invention to provide a twin-plate clutch which may reduce an amount of axial movement of the second clutch disc to suppress increase in a pedal stroke, and also permit easy semi-engagement operation of a clutch.

According to the present invention, facings are fixed on an outer circumference of a disc plate of a first clutch disc under a condition of no cushioning function in an axial direction of the clutch disc. Further, cushion springs are fixed on an outer circumference of a disc plate of a second clutch disc, and facings are fixed on both side surfaces of the cushion springs.

With this arrangement, an amount of axial movement of the second clutch disc of the twin-plate clutch is rendered small, thereby suppressing increase in a pedal stroke and reducing wear between a clutch hub of the second clutch disc and an input shaft. Further, it is possible to easily carry out semi-engagement operation of the clutch owing to the provision of cushioning function in an axial direction of the second clutch disc.

These and other features, objects and advantages of this invention will be more apparent from the following detailed description and the accompanying drawings.

DETAILED DESCRIPTION OF THE PREFERRED EMBODIMENTS

Figure 1:
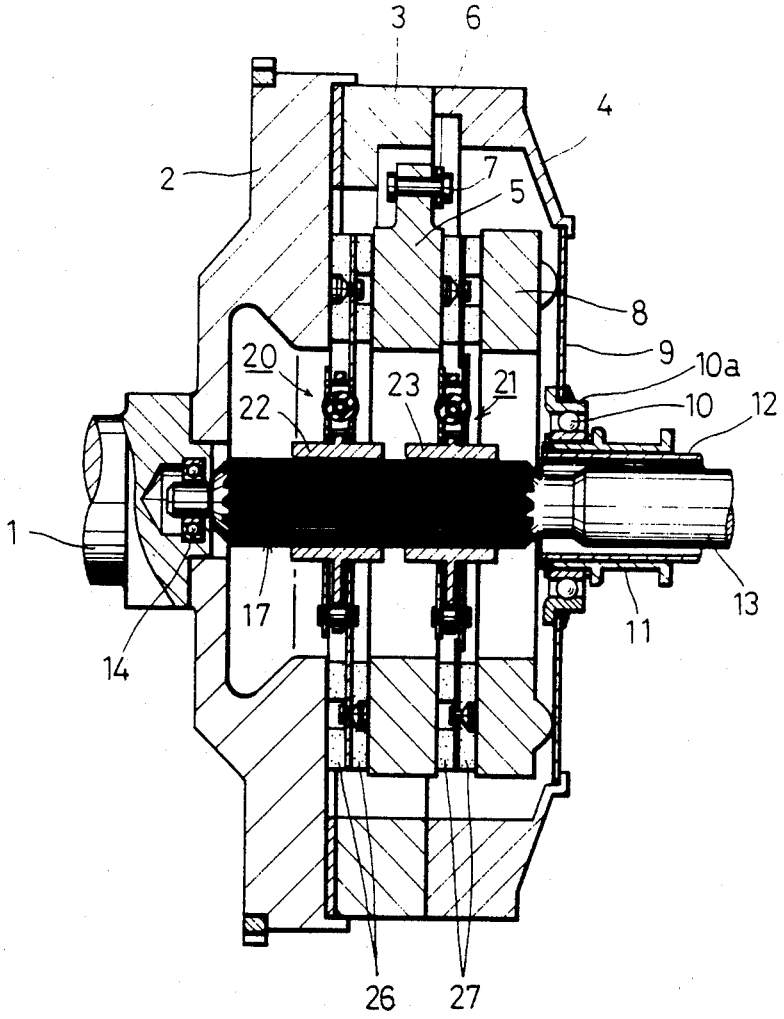
FIG. 1 is a sectional view of a twin-plate clutch of the preferred embodiment of the present invention.
Figure 2:
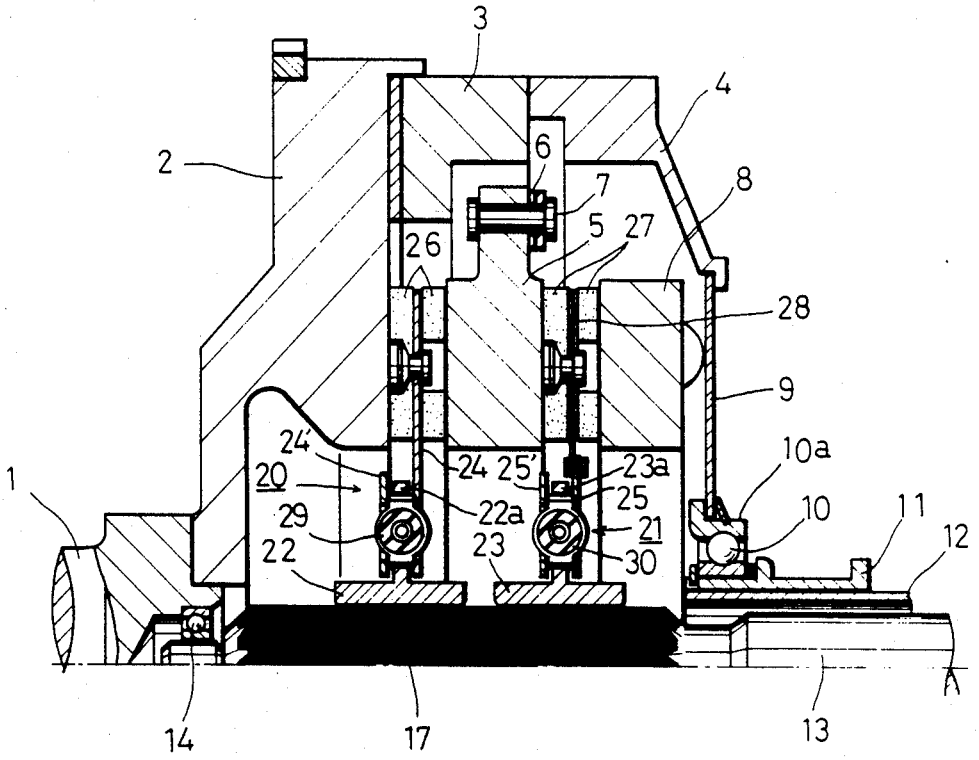
FIG. 2 is a partially enlarged sectional view of FIG. 1.

Referring to FIG. 1 which shows a part of a twin-plate clutch in cross section, a fly wheel 2 is fixed to an end portion of a crank shaft 1 of an engine (not shown) by means of a bolt or the like. An intermediate ring 3 and a clutch cover 4 are fixed to the fly wheel 2, and a diaphragm spring 9 and a pressure plate 8 are assembled inside of the clutch cover 4 by a known fixture. As is best seen in FIG. 2, an annular intermediate plate 5 is interposed between the fly wheel 2 and the pressure plate 8 and is mounted to the intermediate ring 3 by spring plates 6 and rivets 7 in such a manner that displacement of the intermediate plate 5 in an axial direction of a clutch (i.e. in the right and left directions in FIG. 1) is permitted. All the fly wheel 2, intermediate ring 3 and clutch cover 4 are enclosed in a clutch housing (not shown) fixed to a cylinder block of the engine.

An input shaft 13 of a transmission (not shown) is arranged at an axial portion of the clutch, and is rotatably supported at its end to an axial portion of the crank shaft 1 by a pilot bearing 14. The input shaft 13 is formed with spline teeth 17 on an outer circumference thereof, and clutch hubs 22 and 23 of first and second clutch discs 20 and 21 are axially slidably engaged with the spline teeth 17. A pair of facings 26 of the first clutch disc 20 are interposed between the fly wheel 2 and the intermediate plate 5, and a pair of facings 27 of the second clutch disc 21 are similarly interposed between the intermediate plate 5 and the pressure plate 8. Accordingly, the facings 26 of the first clutch disc 20 are strongly held between the fly wheel 2 and the intermediate plate 5 on the basis of a mounting load of the clutch cover 4, that is, a set resilient force of the diaphragm spring 9, while the facings 27 of the second clutch disc 21 are retained under a condition such that they are strongly held between the intermediate plate 5 and the pressure plate 8. As a result, both the clutch discs 20 and 21 receive rotary motion of the fly wheel 2 and accordingly receive rotary motion of the intermediate ring 3, intermediate plate 5, clutch cover 4 and pressure plate 8 as assembled with the fly wheel 2, and transmit the rotation to input shaft 13.

As shown in FIG. 1, a bearing hub 11 having a pull type release bearing 10 is axially slidably fitted on an outer circumference of a cylindrical portion 12 of a front bearing retainer for the transmission which retainer is arranged coaxially with the input shaft 13. An outer race **10*a* of the release bearing 10 is engaged with an inner circumference of a central opening of the diaphragm spring 9. The release bearing 10 is moved with the bearing hub 11 rightwardly as viewed in FIG. 1** by hydraulic pressure or cable action accompanied by depression of a clutch pedal (not shown).

As shown in FIG. 2, the clutch hubs 22 and 23 of the first and second clutch discs 20 and 21 are formed integrally with flanges **22*a* and 23*a* at respective outer circumferences thereof. Disc plates 24 and 24' are fixed on both sides of the flange 22*a*, and similarly disc plates 25 and 25' are fixed on both sides of the flange 23*a*. In a known manner, a torsion rubber 29 is provided between the flange 22*a* and the disc plates 24 and 24', and similarly a torsion rubber 30 is provided between the flange 23*a* and the disc plates 25 and 25'**.

Figure 3:
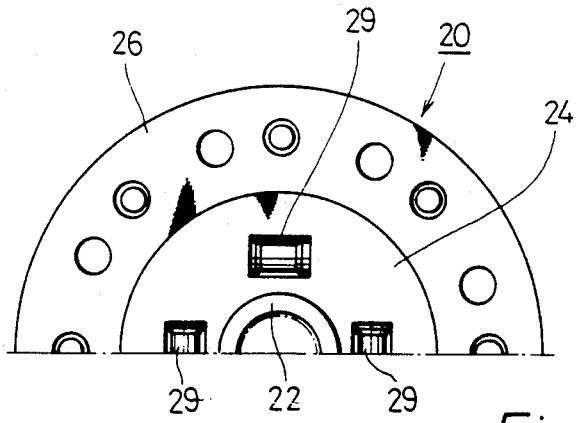
FIG. 3 is a plan view of a part of a first clutch disc in FIG. 2.
Figure 4:
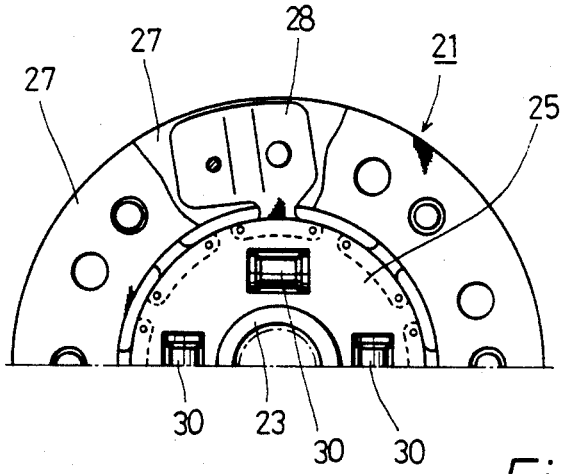
FIG. 4 is a plan view of a part of a second clutch disc in FIG. 2, a part thereof being broken away.

As shown in FIG. 3, the disc plate 24 of the first clutch disc 20 has a larger diameter, and the facings 26 are fixed by rivets on both sides of the disc plate 24 at its outer circumferential portion. As shown in FIG. 4, the disc plate 25 is circularly provided with a plurality of cushion springs 28 fixed by rivets to an outer circumferential portion thereof, and the facings 27 are fixed by rivets on both sides of the cushion springs 28. That is to say, the second clutch disc 21 only has a cushioning function in an axial direction of the clutch owing to the cushion springs 28. Further, the disc plate 24 of the first clutch disc 20 may be provided with a normal plate having no cushioning function in an axial direction of the clutch disc to an outer circumferential portion thereof, and the facings 26 may be fixed on both sides of the plate.

In an engaged condition of the clutch, the facings 26 of the first clutch disc 20 are held between the fly wheel 2 and the intermediate plate 5, and similarly the facings 27 of the second clutch disc 21 are held between the intermediate plate 5 and the pressure plate 8, as previously mentioned, thereby permitting torque transmission between the fly wheel 2 and the input shaft 13.

When the release bearing 10 is slided rightwardly as viewed in FIGS. 1 and 2 along the cylindrical portion 12 of the front bearing retainer in cooperation with depression of a clutch pedal (not shown), the diaphragm spring 9 is displaced with the pressure plate 8 in the same direction by the release bearing 10. As a result, a holding force due to a resilient force of the diaphragm spring 9 to the first and second clutch discs 20 and 21 is released, thus breaking torque transmission between the fly wheel 2 and the input shaft 13, and releasing an engaged condition of the clutch.

Generally, as previously mentioned, the second clutch disc is required to be axially moved to a greater extent than the intermediate plate in a clutch releasing operation, and an amount of axial movement of the intermediate plate is influenced by an amount of cushioning in the axial direction of the first clutch disc. In such a circumstance as above, since the first clutch disc 20 of the embodiment has no cushioning function in the axial direction thereof, the amount of axial movement of the intermediate plate 5 may be rendered small, and accordingly an amount of axial movement of the second clutch disc 21 may be also reduced. As a result, increase in a pedal stroke in engagement and disengagement operations of the twin-plate clutch may be suppressed, and also wear between the clutch hub 23 and the spline teeth 17 of the input shaft 13 may be reduced.

Further, since the second clutch disc 21 has a cushioning function in an axial direction thereof due to the cushion springs 28 interposed between the facings 27, semi-engagement clutch operation may be easily carried out similarly to a normal single plate clutch.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A twin-plate clutch comprising an annular intermediate plate interposed between a fly wheel and a pressure plate, a first clutch disc interposed between said intermediate plate and said fly wheel, and a second clutch disc interposed between said intermediate plate and said pressure plate, wherein said first clutch disc is provided with facings fixed to an outer circumferential portion of a disc plate thereof under a condition of no cushioning function in an axial direction of the first clutch disc, and said second clutch disc is provided with cushion springs fixed to an outer circumferential portion of a disc plate thereof and facings fixed on both sides of said cushion springs.

* * * * *